United States Patent
Takeuchi et al.

(10) Patent No.: US 7,107,324 B2
(45) Date of Patent: Sep. 12, 2006

(54) COMPUTER SYSTEM

(75) Inventors: Tadashi Takeuchi, Yokohama (JP); Ken Nomura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 807 days.

(21) Appl. No.: 10/219,287

(22) Filed: Aug. 16, 2002

(65) Prior Publication Data

US 2003/0212765 A1 Nov. 13, 2003

(30) Foreign Application Priority Data

May 10, 2002 (JP) ............................. 2002-134837

(51) Int. Cl.
G06F 15/16 (2006.01)
(52) U.S. Cl. .................. 709/219; 709/217; 709/218; 709/250; 370/232
(58) Field of Classification Search ............... 709/201, 709/217, 218, 219, 250; 370/232
See application file for complete search history.

(56) References Cited

U.S. PATENT DOCUMENTS 4,891,785 A * 1/1990 Donohoo .................... 709/217
5,701,292 A * 12/1997 Chiussi et al. .............. 370/232
5,774,660 A * 6/1998 Brendel et al. ............. 709/201
6,697,846 B1 * 2/2004 Soltis ......................... 709/217

FOREIGN PATENT DOCUMENTS

JP 11-184780 * 7/1999

OTHER PUBLICATIONS

"Nikkei System Provider", Nikkei Business Publications, Inc., 2001, Mar. 30 issue, pp. 72-77.
"Open Design", No. 3, Ethernet and TCP/IP, CQ Publishing Co., Ltd., pp. 91-99.
"Design of UNIX Kernel", Kyoritsu Shppan Co., Ltd. pp. 51-77.
"Design and Implementation of a Highly Scale Bi-directional Stream Server Using Cooperating HiTactix-BSD System", Collected Papers of Information Processing Society of Japan, vol. 43, No. 1, Jan. 2002, pp. 137-145.

* cited by examiner

Primary Examiner—Yves Dalencourt
(74) Attorney, Agent, or Firm—Mattingly, Stanger, Malur & Brundidge, P.C.

(57) ABSTRACT

The NAS device receives the delivery instruction from the delivery server. The delivery instruction includes the information for identifying the client which is to be the delivery destination of data, and the information for specifying the data to be delivered. In response to the delivery instruction, the NAS device reads the specified data and delivers the specified data to the client specified as the delivery destination of data. The delivery instruction may include the information on the reading rate, if necessary. The NAS device carries out the data reading and the data delivery at the specified reading rate.

2 Claims, 8 Drawing Sheets

COMPUTER SYSTEM

BACKGROUND OF THE INVENTION

The present invention relates to a storage device and a computer system, and more particularly to a storage device for transferring stream data stored in a plurality of computers, storage devices or computer systems (hereafter referred to as "nodes").

Consider a system in which a single computer for delivering data (hereafter referred to as "delivery server") receives a data-delivery request from a client and this delivery server delivers data, which is stored in plural nodes (the delivery server is connected to those nodes through a network), in response to the data-delivery request. As a storage device for realizing the above-mentioned system, a network attached storage (NAS) devices mounting an NFS server module is known ("Nikkei System Provider", Nikkei Business Publications, Inc., Mar. 30, 2001 issue, pp. 72–77, and "Open Design, No. 3, Ethernet and TCP/IP", CQ Publishing Co., Ltd., pp. 91–99). "Ethernet" is a trademark of Fuji-Xerox Co., Ltd.

Figure 1:
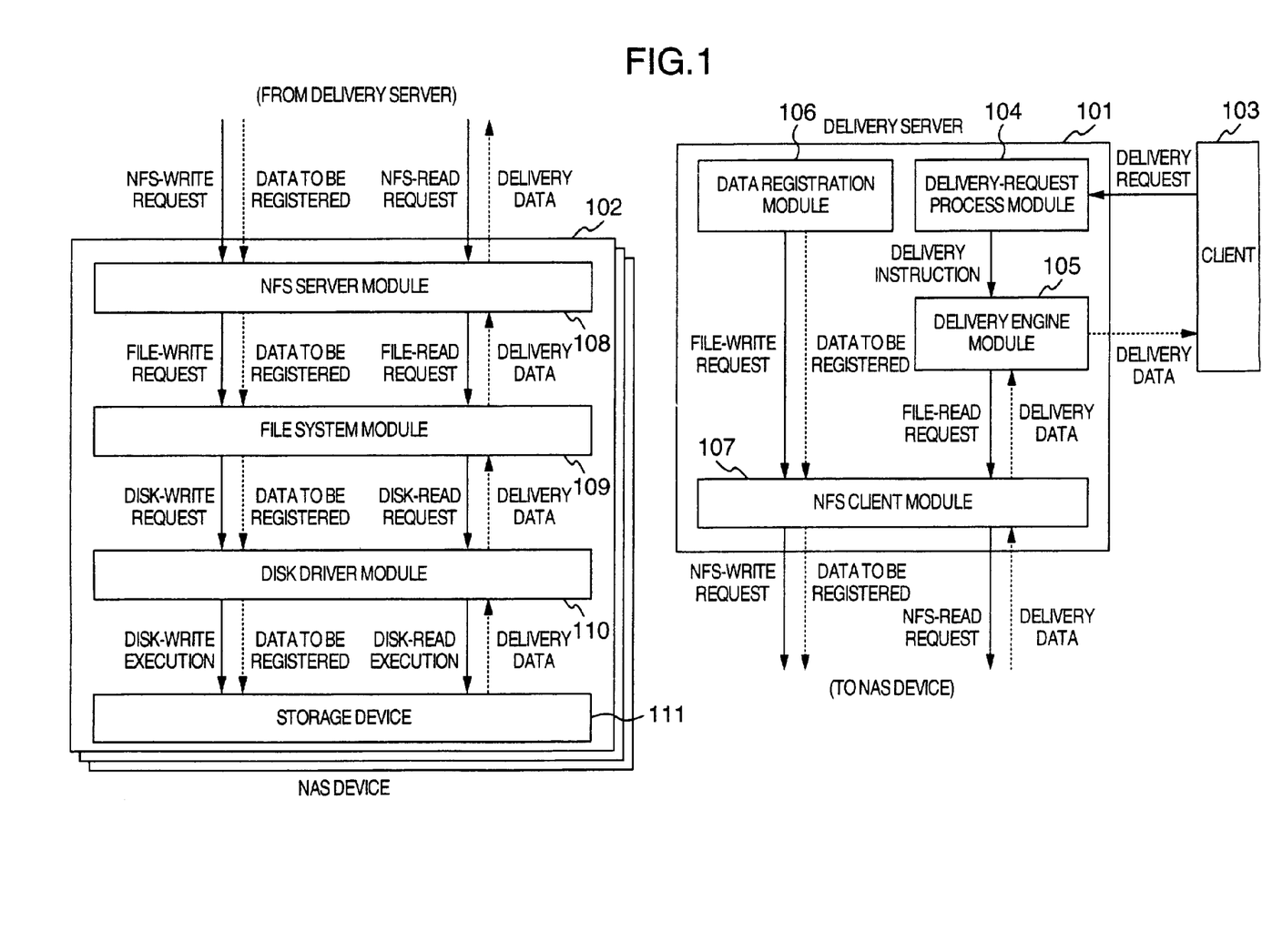
FIG. 1 is a diagram showing the prior art.

FIG. 1 is a diagram showing an example of a software system for realizing the above-mentioned data delivery using the NAS device mounting the NFS server module. In this software system, a delivery server 101 receives a delivery request from a client 103. In response to this delivery request, the delivery server 101 delivers, to the client data, data which is stored in the NAS devices 102 connected to the delivery server 101 through a network.

When receiving the delivery request from the client 103, the delivery server 101 activates a delivery engine module 105. The delivery engine module 105 issues a file-read request to an NFS client module 107 in order to read data, which is specified by the client, from the NAS device 102.

Subsequently, the delivery engine module 105 receives data from the NFS client module 107, and delivers the data to the client which issues the delivery request. A data registration module 106 issues a file-write request to the NFS client module 107 to store the data in the NAS device 102.

The NFS client module 107 receives the file-read request from the delivery engine module 105 or the file-write request from the data registration module 106. In response to the received request, the NFS client module 107 issues an NFS-read request or an NFS-write request to the NAS device 102.

The NAS device 102 receiving the NFS-write request or the NFS-read request from the delivery server 101 activates a file system module 109 and a disk driver module 110. The NAS device 102 executes a disk-write operation or a disk-read operation to a storage device 111 in response to the requests in the order of their arrival.

SUMMARY OF THE INVENTION

In the above system, the delivery engine module 105 performs the delivery process of data. The delivery engine module 105 operates in the delivery server 101. Therefore, the delivery engine module 105 can deliver data only with the data transmission capacity corresponding to the processing capacity of the delivery server 101, in other words, the delivery engine module 105 can deliver data only at a fixed data transfer rate.

When delivering stream data, the delivery server 101 preferably delivers the stream data at a data transfer rate equal to the bit rate of the stream data in order to prevent the underflow or overflow of a buffer on the client side. More specifically, the delivery engine module 105 needs to receive data from the NAS device 102 at a data transfer rate higher than the above-mentioned bit rate. However, since the NFS-read request in the prior art does not include any information on the rate, the NAS device 102 cannot guarantee the data-read operation at a rate higher than the above-mentioned rate.

An object of the present invention is to provide a storage device which can realize the data delivery at a rate higher than a rate corresponding to the processing capacity of a delivery server, and which realizes the data delivery at a rate corresponding to a bit rate of stream data.

In order to achieve the above object, the present invention proposes a storage device having the following features.

The storage device receives, from a delivery server, a delivery instruction which includes information for identifying a client which is to be a delivery destination of data and information for specifying data to be delivered. In response to the delivery instruction, the storage device reads the specified data and delivers the specified data to the identified client which is to be the delivery destination.

In a preferred embodiment of the present invention, the delivery instruction includes, when necessary, information on a reading rate. The storage device reads data at the reading rate.

In a more preferred embodiment, the storage device includes means for extracting information on a delivery timing from the read data. The storage device controls a data-delivery timing to the client according to the above-mentioned information, if necessary.

Other objects, features and advantages of the invention will become apparent from the following description of the embodiments of the invention taken in conjunction with the accompanying drawings.

DESCRIPTION OF THE EMBODIMENTS

Figure 13:
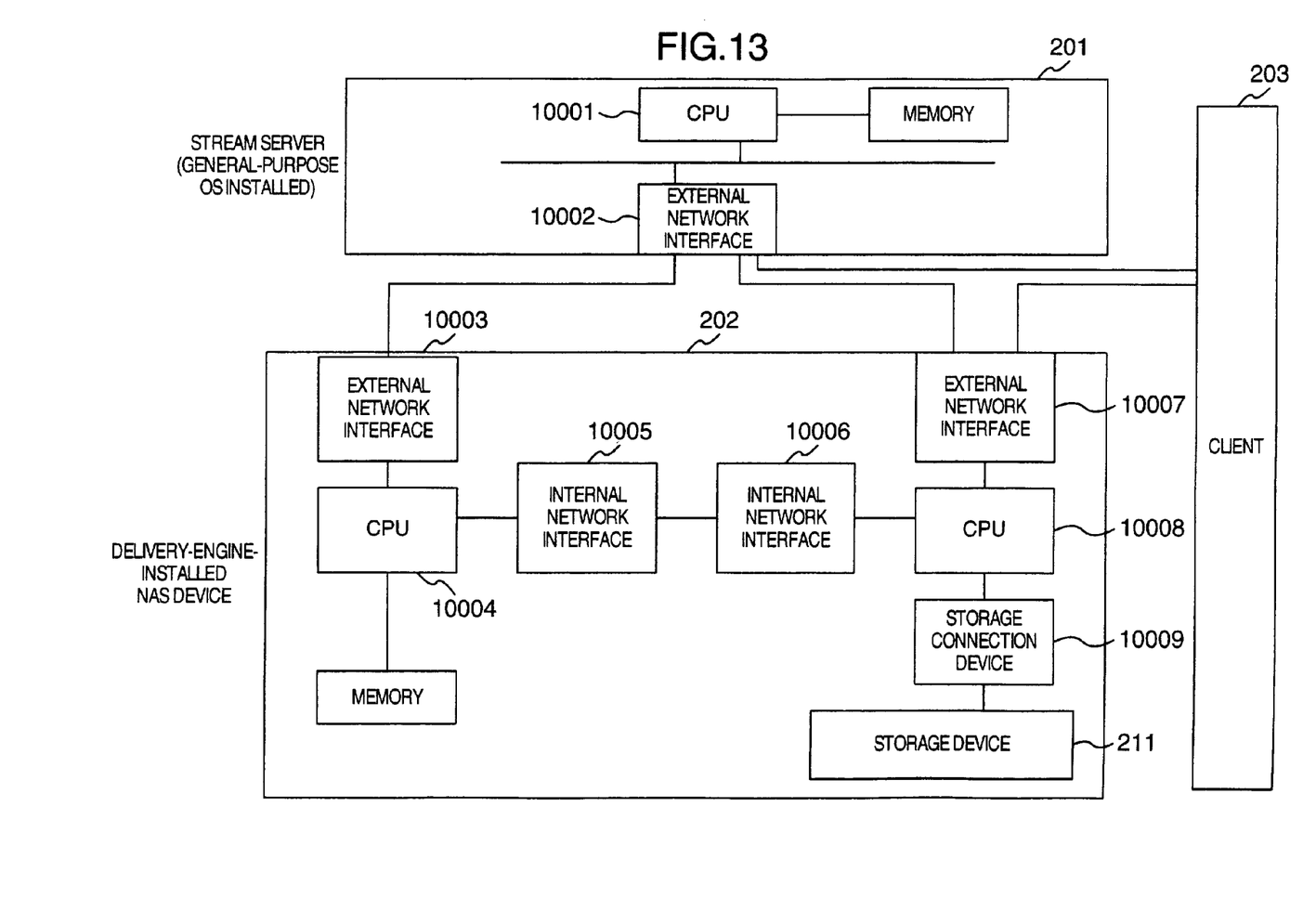
FIG. 13 is a diagram showing a hardware structure according to the present invention.

FIG. 13 is a hardware structure diagram of a system according to a first embodiment to which the present invention is applied.

In this system, a computer for stream-data delivery (hereafter referred to as "stream server") 201 receives a delivery request from a client 203 through a network. The stream server 201 issues a command to a delivery-engine-installed NAS device (hereafter referred to as "NAS device") 202 to transfer stream data, which is stored in the NAS device 202 connected thereto through the network, from the NAS device 202 to the client 203.

The stream server 201 includes a CPU 10001 and an external network interface 10002. The stream server 201 communicates with the client 203 and the NAS device 202 through the external network interface 10002.

The NAS device 202 includes an external network interface 10003 connected to the stream server 201, an external network interface 10007 connected to the stream server 201 and the client 203, CPUs 10004 and 10008, internal network interfaces 10005 and 10006 connecting the CPUs 10004 and 10008, a storage device 211, and a storage connection device 10009 connecting the storage device 211 and the CPU 10008.

Figure 2:
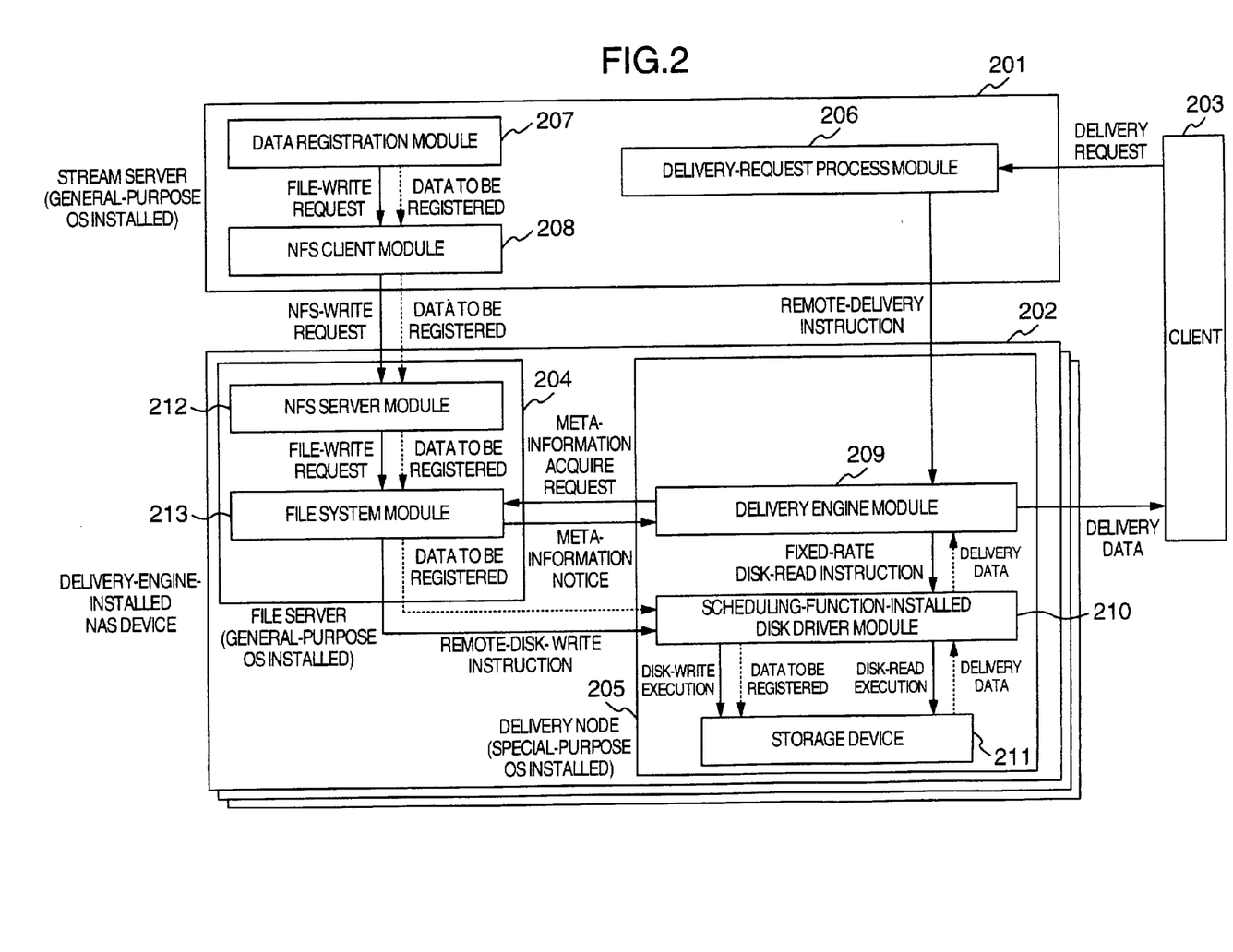
FIG. 2 is a diagram showing a system structure according to a first embodiment of the present invention.

FIG. 2 is a structure diagram of a software in the system shown in FIG. 13.

The stream server 201 has a delivery-request process module 206, a data registration module 207 and an NFS client module 208 in a memory included in the stream server 201. These softwares are executed by the CPU 10001. These softwares installed in a storage device included in the stream server 201, through the external network interface.

In the stream server 201, the CPU 10001 on which the delivery-request process module 206 operates receives the delivery request from the client 203 through the external network interface 10002. The CPU 10001 on which the delivery-request process module 206 operates and which receives the delivery request issues the remote-delivery instruction to the NAS device 202. This instruction is transferred through the external network interfaces 10002 and 10003. This instruction includes information for delivering the stream data specified by the client 203 at an appropriate rate.

On the other hand, when stream data to be registered by the data registration module 207 operating on the CPU 10001 is occurred, the CPU 10001 executes the software for issuing a file-write request to the NFS client module 208 to store the stream data in the NAS device 202.

In the NAS device 202, the CPU 10004 performs the function of the file server 204 and the CPU 10008 performs the function of the delivery node 205.

The file server 204 has the NFS server module 212 and the file system module 213 in memory as software. These softwares are installed in the storage device of the NAS device 202 through the external network interface.

The CPU 10004 on which the NFS server module 212 operates receives an NFS-write request from the CPU 10001 on which the stream server 201 operates. This request comes through the external network interfaces 10002 and 10003. The CPU 10004 executes software for issuing the file-write request to the file system module 213 in order to perform the disk-write operation according to the request. In response to the file-write request, the file system module 213 executes software for issuing a remote-disk-write instruction to the delivery node 205.

The delivery node 205 includes the delivery engine module 209 and the scheduling-function-installed disk driver module 210 as software. When receiving the remote-delivery instruction from the stream server 201, the delivery node 205 executes a software process for activating the delivery engine module 209 on the CPU 10008.

In order to read the stream data, which is to be delivered, from storage device 211, the CPU 10008 on which the delivery engine module 209 operates receives the meta information from the CPU 10004 on which the file system module 213 operates. This meta information is received through the internal network interfaces 10005 and 10006. On the basis of the received data, the delivery engine module 209 further checks where in the storage device 211 the data to be delivered is located. In order to read the delivery data from the location where the data exists, the delivery node 205 activates the scheduling-function-installed disk driver module 210 on the CPU 10008.

The CPU 10008 on which the scheduling-function-installed disk driver module 210 operates executes a read operation of the delivery data from the storage device 211 through the storage connection device 10009 while assuring the data transfer rate requested by the client. The CPU 10008 on which the scheduling-function-installed disk driver module 210 operates also receives a remote-disk-write instruction from the file server 204. This instruction is received through the internal network interfaces 10005 and 10006. According to this instruction, the CPU 10008 on which the scheduling-function-installed disk driver module 210 operates performs the adequate scheduling such that the reading rate of data from the storage device 211 may not be disturbed. More specifically, scheduling is performed in such a way that priority is placed on the data-read operation for the data delivery rather than on the data-write operation. The CPU 10008 on which the delivery engine module 209 operates delivers the read data to the client 203 through the external network interface 10007.

Description will now be made of the operation procedures of the stream server 201 and the NAS device 202.

Description will start with the operation procedure of the stream server 201.

The CPU 10001 of the stream server 201 executes the delivery-request process module 206, the data registration module 207 and the NFS client module 208 as software programs.

The operation procedures when the CPU 10001 executes the delivery-request process module 206 and the data registration module 207 will be discussed. Because the operation procedure of the NFS client module 208 is similar to the method described in "Open Design, No. 3, Ethernet and TCP/IP", CQ Publishing, Co., Ltd., pp. 91–99, its detailed description is omitted in the present specification.

Figure 3:
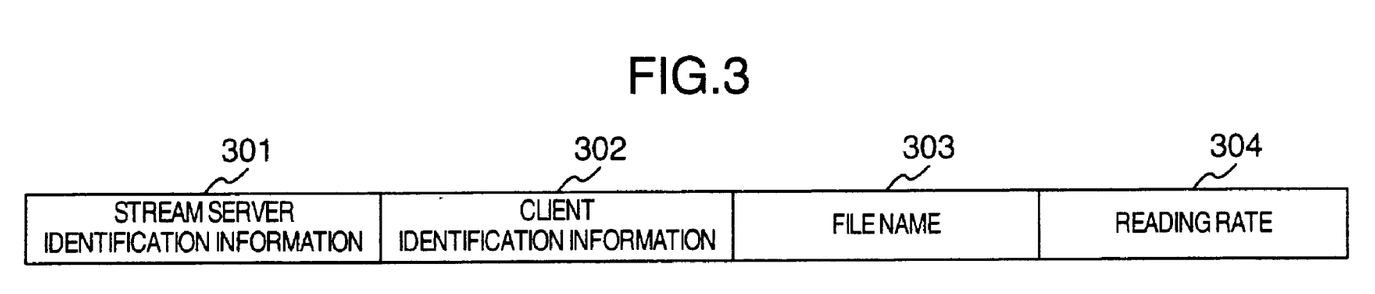
FIG. 3 is a diagram showing a format of a deliver request.

When the CPU 10001 receives the delivery request from the client 203 through the external network interface 10002, the delivery-request process module 206 is activated by the stream server 201. FIG. 3 shows the contents of the delivery-request command transferred from the client. The delivery request includes a stream server identification information entry 301, a client identification information entry 302, a file name entry 303 and a reading rate entry 304.

Information for specifying the stream server 201 which should receive the delivery request is registered in the stream server identification information entry 301. Information for specifying the client which issues the delivery request (or which should receive the delivery data) is registered in the client identification information entry 302. Information for specifying the stream data requested to be delivered is registered in the file name entry 303. Information for specifying the bit rate of the stream data requested to be delivered is registered in the reading rate entry 304.

Figure 4:
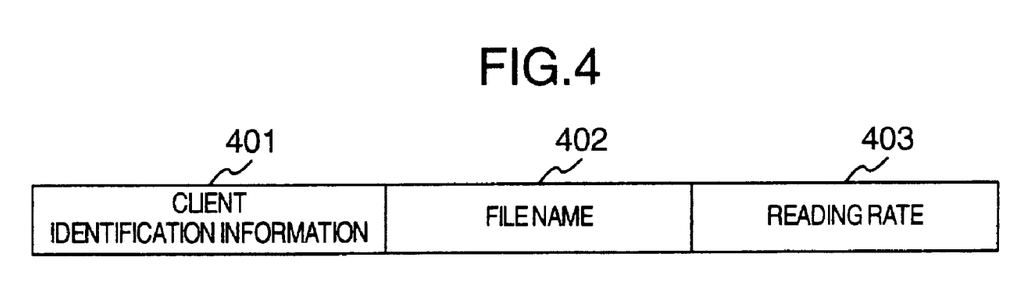
FIG. 4 is a diagram showing a format of a remote-delivery instruction.

When receiving the delivery request, the CPU 10001 on which the delivery-request process module 206 operates executes the software process for extracting the information from the delivery request to issue the remote-delivery instruction to the NAS device 202. FIG. 4 shows the contents of the remote-delivery instruction. The remote-delivery instruction includes a client identification information entry 401, a file name entry 402 and a reading rate entry 403. Because the contents of the entries are similar to the contents of the entries 302–304 shown in FIG. 3, their descriptions are omitted.

When the stream data to be registered in the NAS device 202 occurs, the data registration module 207 is activated by the stream server 201.

Figure 10:
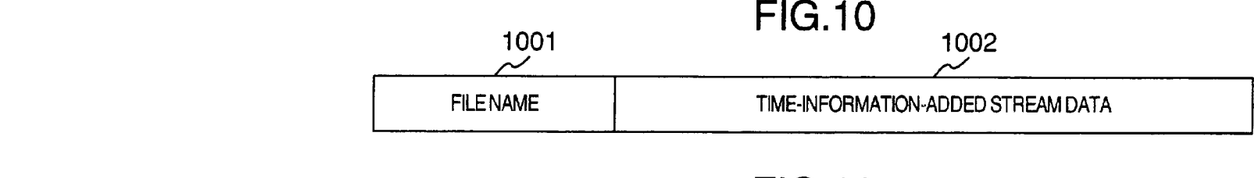
FIG. 10 is a diagram showing a format of a file-write request.

When the data registration module 207 is activated, the CPU 10001 on which the data registration module 207 operates issues the file-write request to the CPU 10004 on which the NFS client module 208 operates. This request is transferred through the external network interfaces 10002 and 10003. FIG. 10 shows the contents of the file-write request. The file-write request includes an entry 1001 in which the file name is registered, and an entry 1002 in which the time-information-added stream data formed by having time information embedded in the format shown in FIG. 8 beside the stream data is registered.

The operation of the NAS device 202 will be described in the following.

The file system module 213 and the NFS server module 212 operate on the CPU 10004 of the NAS device 202. On the other hand, the delivery engine module 209 and the scheduling-function-installed disk driver module 210 operate on the CPU 10008.

Description will next be made of the operation procedures when the CPU 10004 or the CPU 10008 executes the file system module 213, the delivery engine module 209 and the scheduling-function-installed disk driver module 210 as software. Since the operation procedure of the NFS client module 208 is similar to the method described in "Open Design, No. 3, Ethernet and TCP/IP", CQ Publishing Co., Ltd., pp. 91–99, the detailed description of it is omitted in the present specification.

The operation procedure of the file system module 213 will be described in detail.

When the NFS server module 212 issues the file-write request, the file system module 213 is activated by the NAS device 202 on the CPU 10004. The file-write request has information similar to the information shown in FIG. 10.

On the basis of this information, the CPU 10004 on which the file system module 213 operates issues the remote-disk-write request. The CPU 10004 on which the file system module 213 operates transfers the remote-disk-write request to the delivery node (205).

Figure 11:
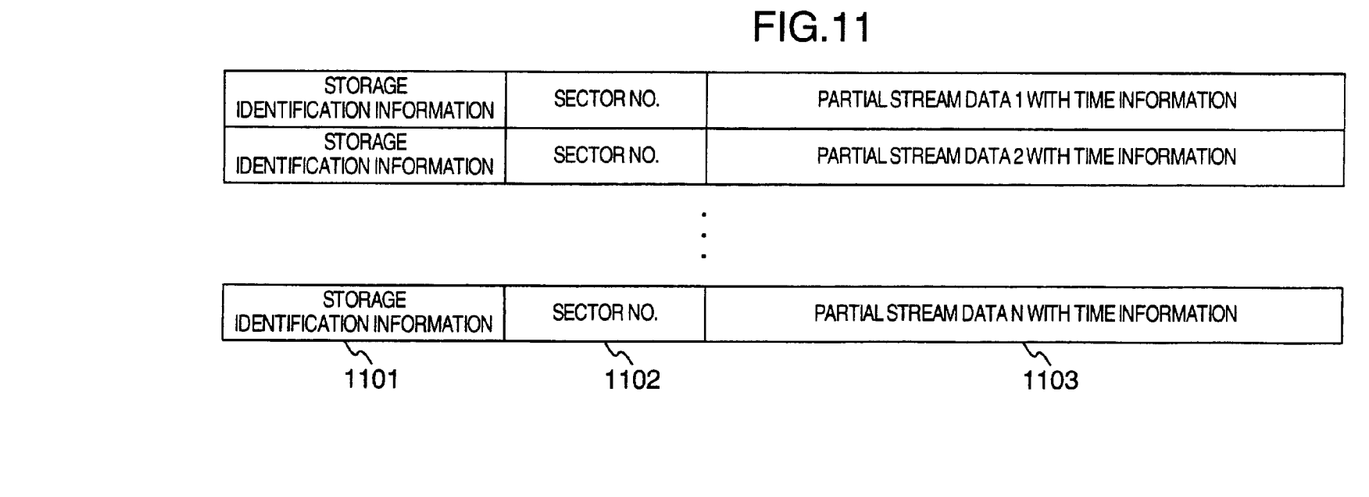
FIG. 11 is a diagram showing a format of a remote-disk-write request.

FIG. 11 is a diagram showing the structure of the remote-disk-write information. The remote-disk-write information includes an entry 1101 in which storage-device-identification information for specifying the storage device 211 where data is to be stored is registered, an entry 1102 in which a sector number for specifying a location of the storage device where data is to be stored is registered, and an entry 1103 in which the partial stream data with time information for specifying data to be stored in the specified location is registered.

As mentioned above, the CPU 10004 on which the file system module 213 operates is put into operation also when receiving the meta-information-acquire request from the delivery node 205. The CPU 10004 on which the file system module 213 operates and which receives the meta-information-acquire request searches for the meta information corresponding to the received request, generates a meta-information notice, and transfers this notice to the delivery node 205.

The method for generating the above-mentioned remote-disk-write request and the method for generating the meta-information notice can be realized by the methods similar to the methods described in "Design of UNIX Kernel", Kyoritsu Shuppan Co., Ltd. pp. 51–77 ("UNIX" is the registered trademark of X/Open Company Limited.). Their detailed descriptions are omitted in the present specification.

The operation procedure of the delivery engine module 209 will be described in detail.

The delivery engine module 209 is put into operation by the NAS device 202 when the CPU 10004 receives the remote-delivery instruction from the stream server 201.

Figure 5:
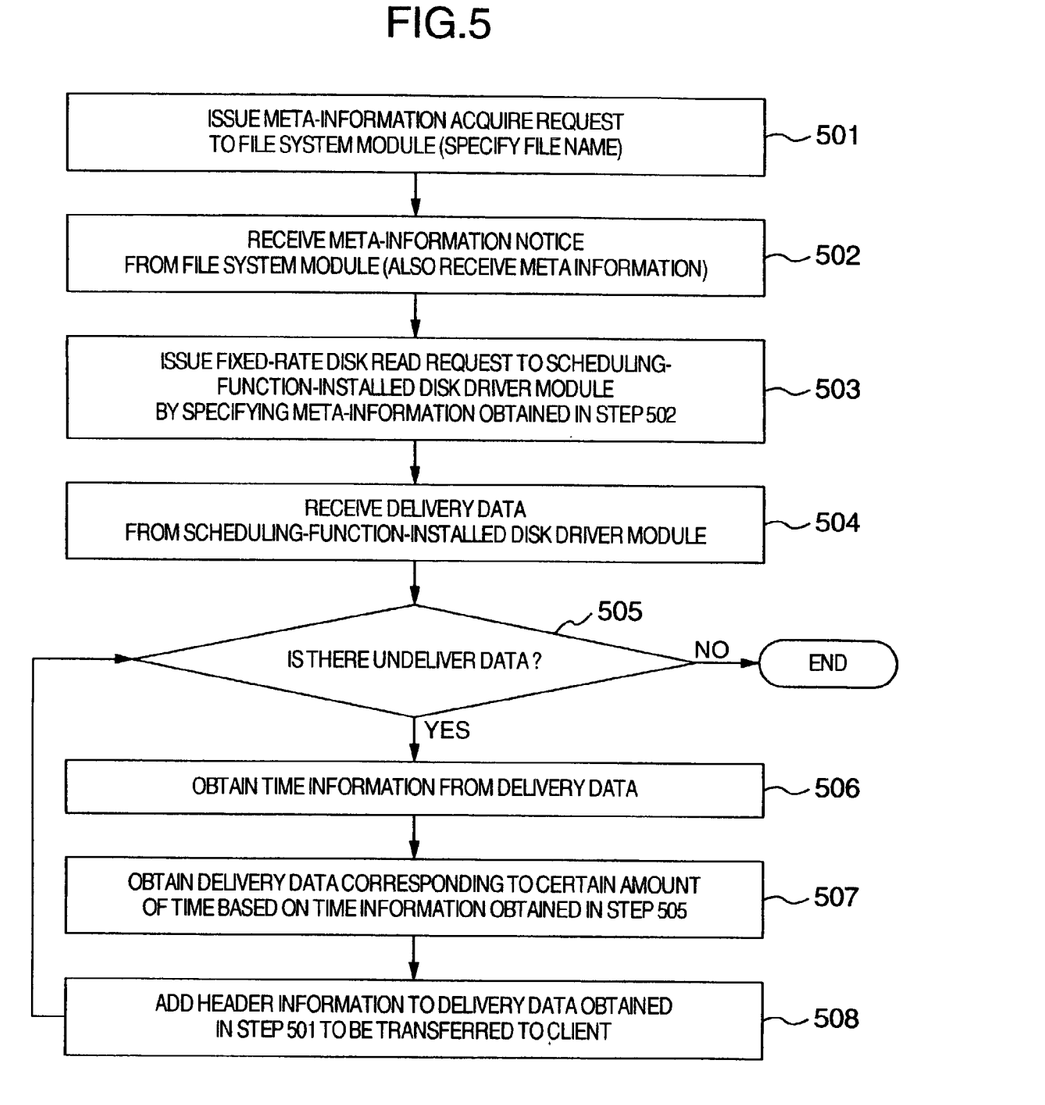
FIG. 5 is a flowchart showing an operation of a delivery engine module.

FIG. 5 is an operation flowchart of the delivery engine module 209 which receives the remote-delivery instruction.

The CPU 10008 on which the delivery engine module 209 operates transfers the meta-information-acquire request to acquire meta information (i.e., information for specifying a location in the storage device 211 where the specified file exists) to the CPU 10004 on which the file system module 213 on the file server 204 operates. At this time, information on the file name 402 included in the remote-delivery instruction is specified (Step 501). This meta-information-acquire request is exchanged through the internal network interfaces 10005 and 10006.

Figure 6:
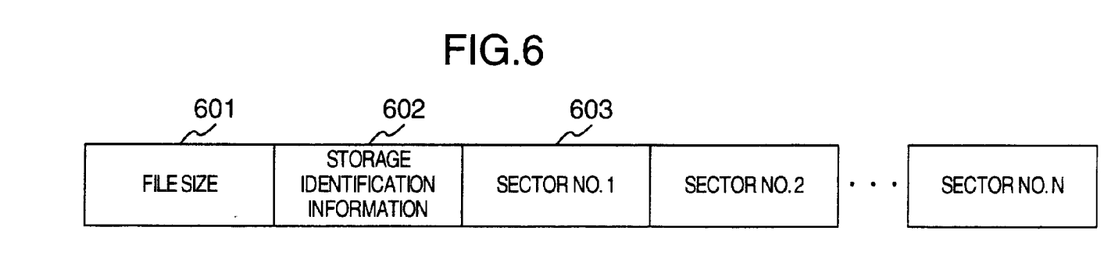
FIG. 6 is a diagram showing a format of a meta-information notice.

The CPU 10008 on which the delivery engine module 209 operates receives the meta-information notice from the CPU 10004 on which the file system module 213 operates. The meta-information notice is also transferred and received through the internal network interfaces 10005 and 10006. FIG. 6 shows information included in the meta-information notice. The meta-information notice includes an entry 601 in which information on a file size is registered, a storage device identification information entry 602 in which information for specifying the storage device 211 where the specified file exists is registered, and a plurality of entries 603 in which a group of sector numbers for indicating the locations on the storage device where the stream data stored in the file exists is registered (Step 502).

Figure 7:
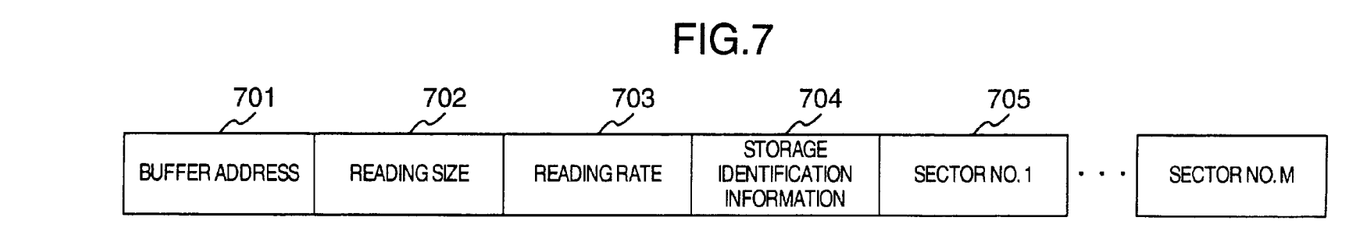
FIG. 7 is a diagram showing a format of a fixed-rate disk-read instruction.

The CPU 10008 on which the delivery engine module 209 operates executes software for issuing a fixed-rate disk-read request to the scheduling-function-installed disk driver module 210. FIG. 7 shows the information included in the fixed-rate disk-read request. The fixed-rate disk-read request includes an entry 701 in which a buffer address where the stream data read from the storage device 211 is stored is registered, an entry 702 in which a reading size is stored, an entry in which a reading rate is registered, an entry 704 in which the storage device identification information is stored, and an entry 705 in which a group of sector numbers for indicating the locations on the storage device where the stream data exists is registered.

For the reading size, the same value as the file size 601 included in the meta-information notice is specified. For the reading rate, the same value as the reading rate 403 included in the remote-delivery instruction is specified. For the group of sector numbers, the same information as the group of sector numbers 603 included in the meta-information notice is specified (Step 503).

Figure 8:
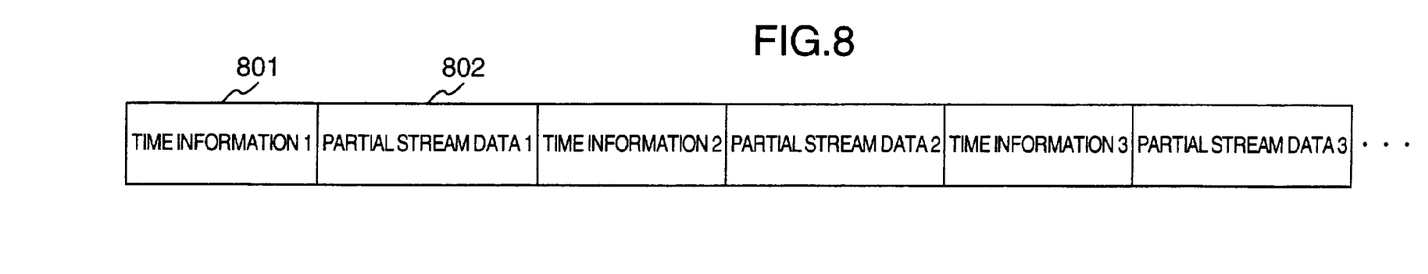
FIG. 8 is a diagram showing a format of delivery data read from a storage device.

The CPU 10008 on which the delivery engine module 209 operates executes a software process for receiving data, which is to be delivered, from the scheduling-function-installed disk scheduler 210. FIG. 8 shows the format of the data to be received. As shown in FIG. 8, the data to be delivered may be divided into pieces of data at unit time intervals. The data of each unit time includes a time information entry 801 and a partial stream data entry 802.

The time information entry 801 stores information on time at which the data at unit time intervals is to be transferred, and the partial stream data entry 802 stores stream data to be transferred at that time (Step 504).

The CPU 10008 on which the delivery engine module 209 operates checks if there is undelivered data (i.e., the data received in Step 504 but undelivered to the client 203). Unless there is any undelivered data, the CPU 10008 terminates the execution of the delivery engine module 209 (Step 505).

If there is undelivered data, the CPU on which the delivery engine module 209 operates extracts the time information from the data received in Step 504 (Step 506).

After this, the CPU 10008 on which the delivery engine module 209 operates compares the current time with the time information obtained in Step 506, and extracts only part of the undelivered data which reaches the delivery time (Step 507).

Figure 9:
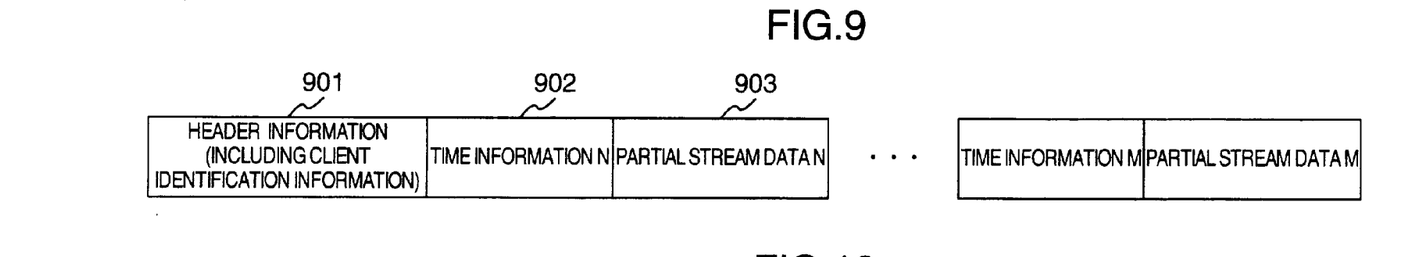
FIG. 9 is a diagram showing a format of delivery data to be delivered to a client.

Further, the CPU 10008 on which the delivery engine module 209 operates adds the header information to the undelivered data extracted in Step 507 to be delivered to the client 203. Subsequently, the CPU 10008 on which the delivery engine module 209 operates executes the software process of Step 505. FIG. 9 shows the format of the stream data delivered to the client.

The stream data delivered to the client includes an entry 901 in which the header information is stored, an entry 902 in which the time information is stored, and an entry 903 in which the partial stream data is stored. The header information includes the client identification information 401 included in the remote-delivery instruction. The time information and the partial stream data correspond to the undelivered data extracted in Step 507 (Step 508).

Finally, detailed description will be made of the operation procedure of the scheduling-function-installed disk driver module 210.

The scheduling-function-installed disk driver module 210 is activated by the NAS device 202 on the CPU 10008 when the software process of receiving the fixed-rate read instruction from the delivery engine module 209 is executed and when the remote-disk-write instruction is received from the CPU 10004 on which the file system module 213 operates.

As has been described, the fixed-rate read instruction includes the information on the reading rate. The CPU 10008 on which the scheduling-function-installed disk driver module 210 operates guarantees the reading rate specified by the fixed-rate read instruction regardless of the arrival frequency of the remote-disk-write instruction. This guarantee can be achieved by the method described in T. Takeuchi et al., "Design and Implementation of a Highly Scale Bi-directional Stream Server Using Cooperating HiTactix-BSD System", Collected Papers of Information Processing Society of Japan, Vol. 43, No. 1, pp. 137–145, and therefore is not described in detail in this specification.

Figure 12:
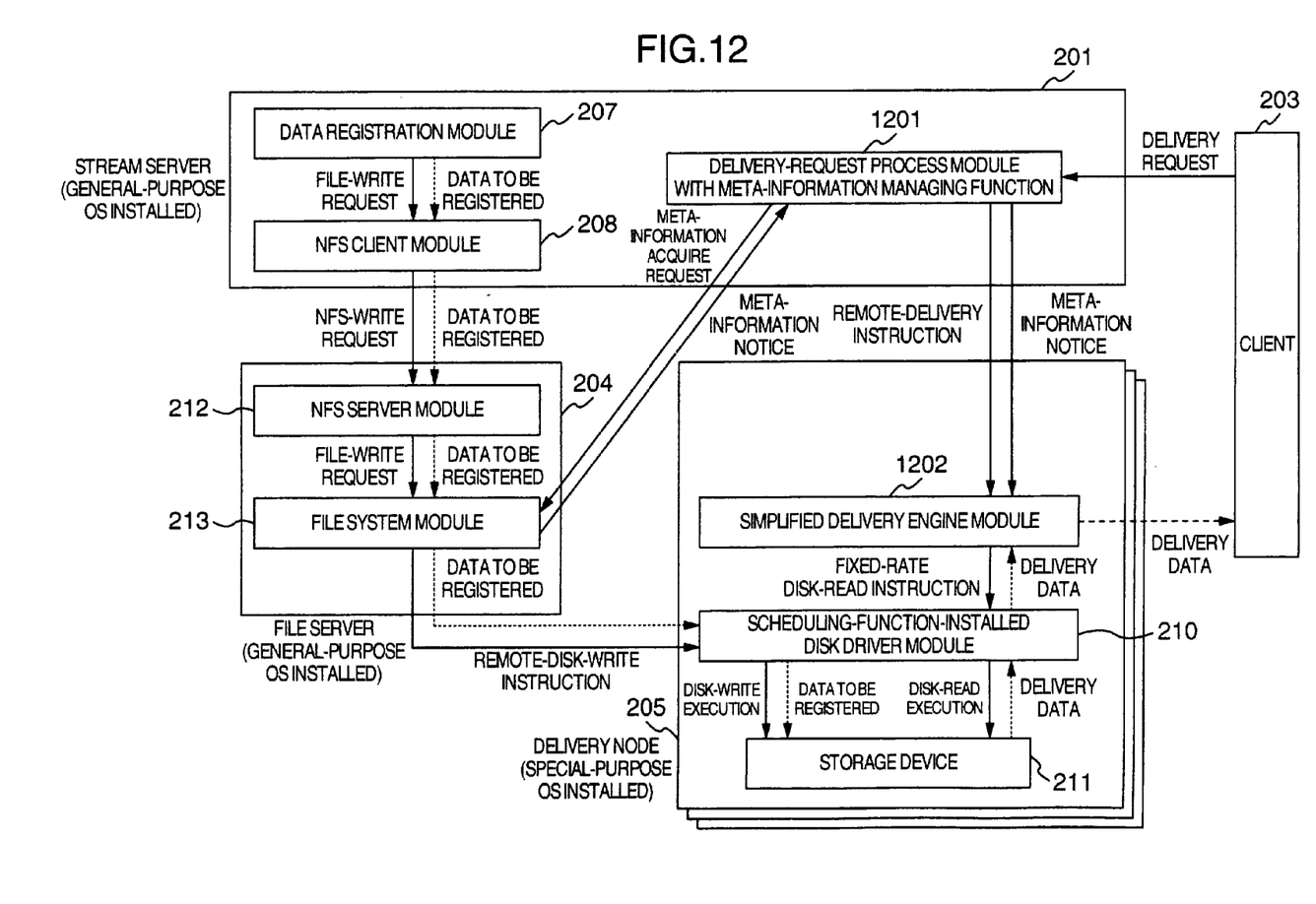
FIG. 12 is a diagram showing a system structure according to a second embodiment of the present invention.

FIG. 12 shows a system according to a second embodiment to which the present invention is applied.

This embodiment is different from the first embodiment in that a delivery-request process module 1201 with meta-information managing function is mounted in the CPU 10001 instead of the delivery-request process module 206, and in that a simplified delivery engine module 1202 is mounted in the CPU 10008 instead of the delivery engine module 209. Detailed description will be made of the operation procedures when the CPU 10001 or the CPU 10008 executes these modules.

The CPU 10001 on which the delivery-request process module 1201 with meta-information managing function operates receives the delivery request shown in FIG. 3 from the client 203. Before the remote-delivery instruction shown in FIG. 4 is transferred to the delivery node 205, the CPU 10001 on which the delivery-request process module 1201 with meta-information managing function operates issues a meta-information-acquire request to the CPU 10004 on which the file system module 213 operates. At this time, a file name is specified in the meta-information-acquire request.

The CPU 10001 on which the delivery-request process module 1201 with meta-information managing function operates receives a meta-information notice from the CPU 10004 to obtain the information shown in FIG. 5. The CPU 10001 on which the delivery-request process module 1201 with meta-information managing function operates transfers the meta-information notice to the CPU 10008 on which the simplified delivery engine module 1202 operates.

In the above procedure, the transfer/reception operation of data between the CPU 10001 and the CPU 10004 is performed through the external network interfaces 10002 and 10003. On the other hand, the transfer/reception operation of data between the CPU 10001 and the CPU 10008 is performed through the external network interfaces 10002 and 10007.

When executing the simplified delivery engine module 1202, the CPU 10008 performs the operation similar to the operation of executing the delivery engine module 209. However, the CPU 10008 does not communicate with the CPU 10004 on which the file system module 213 operates, in order to obtain the meta information. The CPU 10008 obtains the meta information from the CPU 10001 on which the delivery-request process module 1201 with meta-information managing function operates, before receiving the remote-delivery instruction.

In the second embodiment, since the delivery node 205 communicates only with the stream server 201, the operation of the delivery node 205 can be simplified in comparison with the first embodiment.

In the present invention, the delivery engine module operates on the delivery node. For this reason, the delivery rate is not limited by the processing capacity of the stream server. Further, the data delivery rate can be improved scalably by increasing the number of the delivery nodes.

Further, in the present invention, the delivery node is notified of the reading rate when the remote-delivery instruction is given thereto, and thus the rate at which the CPU, on which the delivery engine module operates, reads the stream data from the storage device can be guaranteed. When the CPU on which the delivery engine module operates transfers the delivery data to the client, it reads the time information of the stream data to be delivered, and delivers the stream data at the appropriate rate. This makes it possible to prevent the occurrence of the underflow or overflow at the buffer on the client side.

Furthermore, in the present invention, the stream server and the file server can be realized using the general-purpose operating system (to execute the NFS client module and the NFS server module), and the delivery node can be realized using the operating system dedicated to the stream process (to execute the scheduling-function-installed disk driver module). Note that the operating system dedicated to the stream process generally does not include functions for executing the NFS client module and the NFS sever module. However, according to the present invention, the above-mentioned functions need not be added to the operating system dedicated to the stream process, and the high-performance delivery of the stream data can be achieved by development of simple software.

According to the present invention, data can be delivered at the rate higher than the rate corresponding to the processing capacity of the delivery server. Further, the data delivery according to the bit rate of the stream data can be realized.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage device which is connectable to a first computer and a second computer via a network, comprising:
   a control processing unit;
   a storage unit; and
   a network interface connectable to said network,
   wherein said control processing unit:
      stores requested data in said storage unit in response to a data-write request from said first computer,
      receives a delivery instruction from said first computer, said delivery instruction including information for identifying said second computer which is to be a delivery destination of data, and information for specifying data to be delivered, and
      reads specified data in response to said delivery instruction to deliver said data to said second computer which is to be said specified delivery destination of data;
   said delivery instruction includes information for specifying a reading rate of said data;
   said control processing unit reads said data at said reading rate; and
   wherein said control processing unit:
      reads timing-specifying information for specifying a timing for delivering said data from said read data,
      adds information for identifying said second computer, which is to be said delivery destination of data, to said read data, and
   delivers said read data added with said information for identifying said second computer, to said second computer which is specified to be said delivery destination of data according to said timing-specifying information.

2. A data transfer method in a storage device which is connectable to first and second computers via a network, comprising the steps of:
   storing requested data in response to a data-write request from said first computer;
   receiving a delivery instruction from said first computer, said delivery instruction including information for identifying said second computer which is to be a delivery destination of data, information for specifying data to be delivered, and information for specifying a data reading rate;
   reading said specified data according to said delivery instruction and according to said data reading rate;
   reading information for specifying a data-delivery timing from said read data;
   adding information for identifying said second computer which is to be said delivery destination of data, to said read data; and
   delivering said read data added with said information for identifying said second computer, to said second computer which is specified to be said delivery destination of data, according to said information for specifying said data-delivery timing.

* * * * *